UNITED STATES PATENT OFFICE.

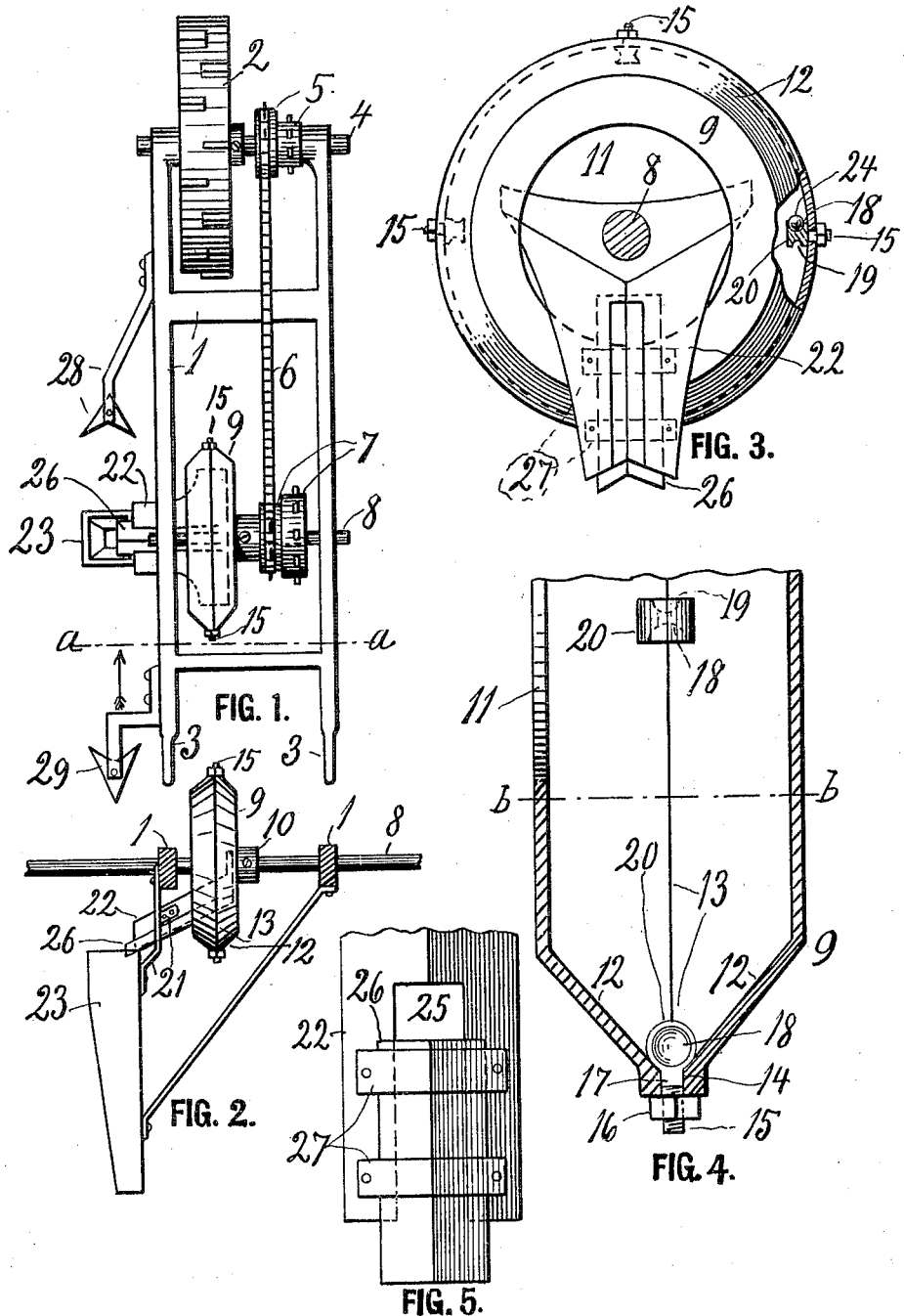

CARL J. STEIN, OF WHITE EARTH, NORTH DAKOTA.

SEEDER.

971,090.

Specification of Letters Patent.  Patented Sept. 27, 1910.

Application filed February 25, 1910. Serial No. 546,011.

*To all whom it may concern:*

Be it known that I, CARL J. STEIN, a subject of the King of Norway, who have declared my intention to become a citizen of the United States, residing at White Earth, in the county of Ward and State of North Dakota, have invented a new and useful Seeder, of which the following is a specification.

My invention relates to seed planting devices; and the object is to provide a convenient and efficient mechanism for delivering one or more seeds at a time from a magazine in planting peas, beans, corn and any other seed for which the sizes of the seed-moving cups of the machine may provide.

The invention is well adapted as an attachment to seed drills and planters in general, but this will be as readily understood by showing it applied to any simple planting machine, as will appear from the accompanying drawing, in which,—

Figure 1 is a top view of a man-power planting machine embodying my invention. Fig. 2 is a section on the line $a-a$ in Fig. 1 with the sprockets on rear shaft omitted. Fig. 3 is a partly sectional enlarged face view of the seed magazine and the chute conveying the seed therefrom, viewed as from the left in Fig. 2. Fig. 4 is an enlarged radial section downward through the lower half of the seed magazine 9 in Fig. 3. Fig. 5 is a bottom view of the lower portion of the chute 22 in the other views.

Referring to the drawing by reference numerals, 1 designates the frame, 2 the traction wheel and 3 the handles of a seed planter adapted to be pushed by a man along upon the field to be planted. The wheel 2 is fixed on a shaft 4, which is journaled in the frame and rotates with it sprocket-wheels 5 of different sizes. Either of said sprockets may be connected by a link-belt 6 with similar sprockets 7 fixed on a shaft 8, which is also journaled on the frame and has affixed on it a seed magazine 9. Said magazine may be described as a short cylinder having one bottom provided with a hub 10 fixed on the shaft 8 and its other bottom provided with a large central opening 11, while the cylinder proper is tapered toward both ends, whereby its bulging sides 12 form a circular V-shaped groove 13. Along the deepest line of said groove are provided at equidistant points slotted holes 14 in each of which is inserted from within the magazine a bolt 15 having a nut 16 to hold it in place and near the other end is a square or preferably flat portion 17 fitting in the hole to insure that the bolt when being inserted will be turned in one of two opposite directions and thereby present in line with the groove 13 one of the two opposite side pockets or cups 18 and 19 with which the bolt head 20 is provided; said cups are one smaller than the other so as to adapt them for carrying large or small seed or many or few seeds as the case may require, and according to which side of the bolt head is turned in the direction of rotation of the magazine.

From the explanation just given it is evident that the exchange from use of the one size seed cup to the other may be accomplished by either turning the cups half a turn around by turning the bolts carrying the cups, or by reversing the rotation of the magazine either by using a cross belt or other reversing gear. The sizes of the cups, especially for great variation in sizes, may also be accomplished by exchanging the bolts for other ones with larger or smaller seed cups in their heads.

Extending outward from the interior of the magazine and secured to the frame work, as at 21 in Fig. 2 or otherwise, is a chute 22, whose inner broad end receives and conveys into the seed dropping tube 23 each charge of seed as fast as it is dropped into the chute from each seed cup 18 as the same empties itself by turning over in the upper part of the magazine after it has been carried from the lower part of the magazine upward as indicated by a seed 24 in Fig. 3.

The magazine may be filled with seed as far as up to the line $b-b$ in Fig. 4. Such filling is done through an aperture 25 in the chute (see Fig. 5), which is closed by a slide 26 sliding between the chute and cross bars 27 secured at the underside thereof.

In front of the seed-conveying tube 23 moves a furrow opener 28 fixed on the frame; and rearward of said tube is fixed to the frame a furrow-closer 29.

In operation the machine shown is grasped by the handles and pushed along on the field and the parts operate as already described; but it is obvious that when the invention is applied to large seeders or drills drawn by horses or other power, the shaft 4 represents any rotating shaft in the machine and the shaft 8 is mounted in suitable bearings upon the machine and is then of the necessary length to be provided with one seed magazine 9 for each seed dropping tube of the machine. The distance between the hills being planted is regulated by moving the link belt 6 onto the desired size pulleys; and may also be regulated by moving the bolts having the seed cups at increased or decreased distances apart, holes being provided for such moving of the bolts and temporarily filled up by screw plugs, (not shown).

It will of course be understood that the gravitation keeps the seed supply always in the lower portion of the magazine, the supply sliding as the cylinder rotates, and the seed cups passing through the supply carry before them and upward one or more seeds each according to their size, and the V-shape of the magazine causes all its contents to so be engaged.

What I claim is:

In a seeder, a frame, a rotating magazine having an internal circular groove and in one end a central opening, members with seed-carrying cups detachably and reversibly secured at equidistant points in the groove; each cup being made with a large and a small seed-carrying cavity arranged in opposite direction on the member holding the cup in place, a chute secured on the frame and extending into the opening in the end of the magazine for conveying therefrom the seeds dropped by the cups upon the upper and inner end of the chute, and means on said members and magazine for holding the small and the large seed cavity alternately in direction of the rotation of the magazine.

In testimony whereof I affix my signature, in presence of two witnesses.

CARL J. STEIN.

Witnesses:
A. M. CARLSEN,
E. C. CARLSEN.